Patented June 17, 1952

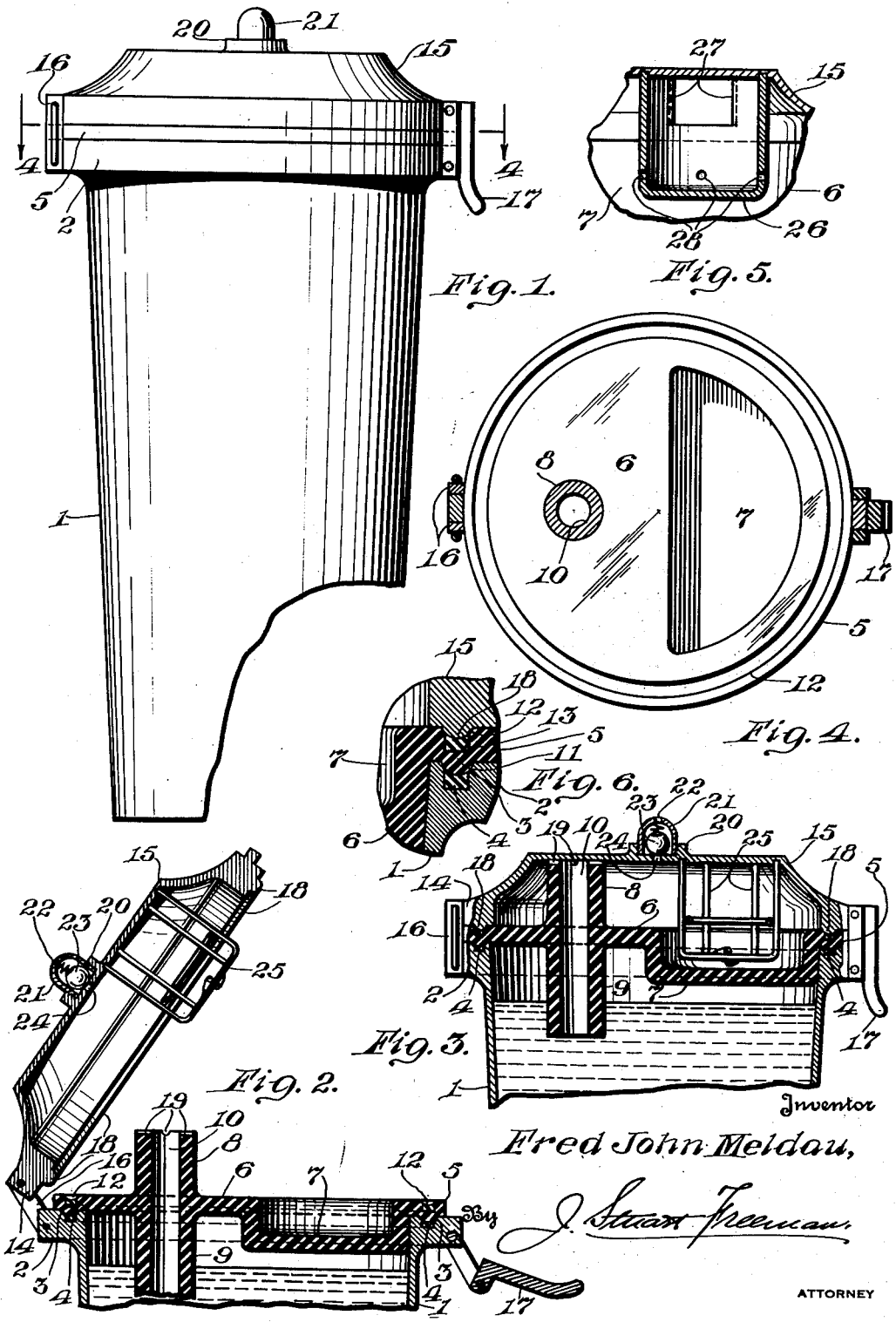

2,600,901

UNITED STATES PATENT OFFICE 2,600,901

BEVERAGE CARBONATING DEVICE

Fred John Meldau, Denver, Colo.

Application March 7, 1950, Serial No. 148,084

15 Claims. (Cl. 261—121)

The object of the invention is to provide improvements in carbonating devices broadly, but more particularly in one that is designed for and adapted to home use, and that is capable of numerous variations in shape and construction.

Another object is to provide a device of this class that makes it possible for individuals in their homes or elsewhere to enjoy the carbonation of any and all forms of fruit juices and extracts, such as can be prepared from the many types of fruit and other flavors available to the average housekeeper, whether from his own trees, vines, shrubs, roots, etc., or which he may purchase from his local stores, without having to depend upon the relatively limited selection of pre-carbonated beverages available on the market, which in many cases do not appeal to him, or to which he may be allergic, and which involve the nuisance and expense incident to the involvement of the usual commercial bottles supplied by the professional bottlers, such as extra charges to offset breakage or loss, and return and redemption of the same after being emptied.

A further object is to provide a device of this character, that can be prepared by filling it with the desired uncarbonated beverage, loading an internal holder with a suitable acid-alkali body, bringing said body into contact with or full immersion in the said beverage upon and as a result of the act of closing the closure of the device, and thereafter maintaining the pressure resulting from the generation of carbon dioxide, until such time as it is desired to pour the resulting carbonated beverage therefrom.

Still another object is to provide in a device of this character the combination of a vessel adapted to receive an uncarbonated liquid, with a closure pivotally secured thereto, a tray normally positioned between said vessel and said closure, said tray having a depressed portion and an aperture surrounded by oppositely directed tubular extensions, one of which closely approaches the inner surface of said closure, while the other normally extends beneath the liquid level in said vessel, the cooperation between said vessel and said tray and between said tray and said closure normally being substantially pressure-tight, while a suitable relief or safety valve or equivalent latch may be provided if desired.

A still further object is to provide in a device of this character the combination of a vessel, a closure therefor, an interposed tray having a depressed reservoir portion, and a hollow holder for gas-producing chemicals in liquid and/or tablet form carried by the inner side of said closure and normally extending below the liquid level in the reservoir portion of said tray.

With the objects thus briefly set forth, the invention comprises further details of construction which are hereinafter fully brought out in the following description, when read in conjunction with the accompanying drawings, in which Fig. 1 is an elevational vew of a carbonating device comprising one embodiment of the invention; Fig. 2 is a vertical diametrical section through the upper portion of the same; Fig. 3 is a section similar to Fig. 2 but with the closure in operative position; Fig. 4 is a plan view of the tray element per se on the line 4—4 of Fig. 1; Fig. 5 is a vertical section of a plastic or similar holder for gas-producing chemicals and the supporting portion of the closure of said vessel; and Fig. 6 is an enlarged fragmentary section showing one form of the improved joint between the closure, tray and vessel elements for maintenance of highest safe pressures.

Referring to the drawing, a vessel 1 of any desired size, shape and material may be used, but which would probably be preferred in the general shape and size of a so-called cocktail shaker, having at its uppermost open end portion a peripherally extending flange 2, which if possible to make absolutely true to the extent that characterizes molded plastic articles, may be simply plane and unbroken. However, in order to maintain within such vessel a substantial degree of pressure, in order to preserve a carbonated state of the beverage therein, said flange may be provided with a groove 3, that if desired may extend downwardly a sufficient distance to receive an annular rubber or similarly resilient, gas- and watertight gasket 4.

Normally resting upon the flange 2 is the peripheral portion 5 of a tray 6, that comprises a depressed reservoir 7, that may be of any desired shape, depth and area, and a pair of upwardly and downwardly projecting tubular extensions 8 and 9, which are axial in alignment and through which extends an axial bore 10, to provide a means of communication between the chambers above and below said tray, when the device is assembled in closed position as hereinafter described. This tray may be of a sufficiently hard rubber or the like to hold its molded shape during normal use, but sufficiently resilient and yielding to make possible a gas- and watertight joint between its periphery and the flange 2 of said vessel, in which case a tongue-and-groove joint and/or a rubber gasket would not be required. On the other hand, if said tray is made of molded plastic and incapable of maintaining a tight joint, the under side of its periphery may be provided with a tongue 11 such as will enter the vessel's groove 3 and contact the gasket 4, if present, and the upper side of said gasket may be provided with a groove 12 and also a gasket 13, which are preferably exactly similar to the groove and gasket with which the vessel is provided.

The periphery 14 of a closure 15 of any suitable shape and cross section is hingedly secured to the peripheral flange 2 of said vessel by means of links 16, or other suitable connection, while diametrically opposite such connection said vessel flange is provided with a latch 17, that is detachable from but normally operatively engages the rim of said closure to secure the latter in tightly closed position. Like said tray, the under surface of said closure may be provided with a tongue 18, that is adapted to enter the groove 12 of said tray, if present, it being understood as before mentioned that if the tray is formed of rubber or the like, certainly neither of the gaskets 4 and 13 is required, while if possible to maintain the necessary desired pressure a tight enough joint can be maintained between closure and tray and between tray and vessel the tongue-and-groove joints herein provided need not be present. In any case a function of said latch and hinged connection is to insure a gas-tight compound joint between said closure and said vessel with the tray interposed between them. However, if desired for the sake of safety said latch may be of such nature as to yield coincident with too high a pressure, and thereupon permit said closure to rise sufficiently to permit the escape of excess pressure above a predetermined degree.

When in its lowermost operative position, the top of said closure comes into substantially or complete contact with the upper end of the upper tray extension 8, so as to prevent the liquid phase of effervescing chemicals above said tray from accidentally passing into said vessel by way of said tubular connection, while gas generated by the chemical action in the reservoir 7 is permitted to escape into said tube and thence into said vessel by way of radial grooves or serrations 19, that cross the uppermost surface of said upper tray extension 8. Thus, while the upward extent of the upper tray extension is limited by the height of said closure top above said tray, the length of the lower tray extension 9 is determined by the depth at which it is desired that carbonating gas from above said tray shall enter the body of the initially uncarbonated liquid in the vessel beneath said tray, it being considered essential that the lower discharge end of said lower extension shall be below the surface of the liquid in said vessel, in order that the gas under pressure can be assured of actually entering the body of said liquid, as otherwise the surface tension of the liquid at least would retard if not actually prevent the desired carbonation even over a substantial period of time.

If desired by some, an additional safety or relief valve may be provided in the upper portion of said closure, and may be in addition to or in lieu of a yielding latch as hereinbefore referred to, while as also herein emphasized no form of relief means or safety valve need be provided if the mere surface joints between closure and tray and between tray and vessel are sufficiently tight, yet capable of flexing sufficiently to permit the escape of undesirable excess pressures. For purposes of illustration, the relief valve here disclosed comprises an outwardly extending circular flange 20, threaded to receive a hollow closure member 21, provided with an orifice 22 and enclosing a spring-pressed ball 23, that normally yieldingly closes a port 24 in said closure. Variations in the degree of resiliency of the springs used effects a difference in the degree of excess pressure, that will be retained within the device when the closure is in its lower operative position, and the carbonation of a beverage is taking place.

In the operation of a device of this character, it is desirable that effervescence shall not begin until the closure is in its lowermost operative position, which presupposes that the reaction chemicals must not contact water in the tray reservoir 7 until this has been accomplished. Therefore, a container of wire mesh 25 (Fig. 2) is provided for use with self-contained bodies of chemicals in the form of pellets, tablets, lumps, or the like, whereas for use with either solid bodies or with powders a molded container 26 (Figs. 2 and 5) may be provided, the latter essentially having a normally upper charging aperture 27 and one or more smaller apertures 26 at or adjacent to the bottom of the same, by which water in said reservoir can enter said container, and contact and cause effervescence of the chemicals, upon said container being lowered beneath the level of such reservoir water, as the closing of said closure is effected. In either case, effervescence immediately starts, gas is formed and pressure built up, thereby forcing the gas into the liquid in the vessel, as hereinbefore described, where carbonation may be maintained as long as desired under a predetermined pressure.

Having thus described my invention, what I claim and desire to protect by Letters Patent of the United States is:

1. A beverage carbonating device, comprising the combination of a vessel adapted to contain an uncarbonated liquid, a closure for said vessel, an intervening tray, substantially gastight joints between said closure and said tray and between said tray and said vessel, a container for gas-producing chemicals carried by said closure and normally extending downwardly therefrom into a reacting liquid in said tray, and a passageway to lead gas from above said tray to the space beneath said tray.

2. A beverage carbonating device, comprising the combination of a vessel adapted to contain an uncarbonated liquid, a closure for said vessel, an intervening tray, substantially gastight joints normally between said closure and said tray and between said tray and said vessel, a container for gas-producing chemicals carried by said closure and normally extending downwardly therefrom into a reacting liquid in said tray, and a tubular extension of said tray projecting upwardly into close proximity with said closure sufficient to permit gas to pass while minimizing the possibility of liquid passing through said tray, and a tubular extension of said tray projecting downwardly into said vessel.

3. A beverage carbonating device, comprising the combination of a vessel adapted to contain an uncarbonated liquid, a closure for said vessel, an intervening tray, substantially gastight joints normally between said closure and said tray and between said tray and said vessel, a container for gas-producing chemicals carried by said closure and normally extending downwardly therefrom into a reacting liquid in said tray, and a tubular extension of said tray projecting upwardly into approximate contact with the inner surface of said closure and downwardly into said vessel, said upward extension being provided with a passageway to permit gas from above said tray to enter and pass through said extension and into said vessel beneath said tray, while resisting the passage of liquid.

4. A beverage carbonating device, comprising the combination of a vessel adapted to contain an uncarbonated liquid, a closure for said vessel, an intervening tray, substantially gastight joints between said closure and said tray and between said tray and said vessel, a container for gas-producing chemicals carried by said closure and normally extending downwardly therefrom into a reacting liquid in said tray, and means to permit the escape of excess pressure above a predetermined degree from within said vessel.

5. A beverage carbonating device, comprising the combination of a vessel adapted to contain an uncarbonated liquid, a closure for said vessel, an intervening tray, substantially gastight joints between said closure and said tray and between said tray and said vessel, a container for gas-producing chemicals carried by said closure and normally extending downwardly therefrom into a reacting liquid in said tray, and a passageway to lead gas from above said tray to the space beneath said tray, and a yielding latch operative to secure said closure, said tray and said vessel in a sufficiently tight relationship to maintain a predetermined pressure within said vessel.

6. A beverage carbonating device, comprising the combination of a vessel adapted to contain an uncarbonated liquid, a closure for said vessel, an intervening tray, substantially gastight joints between said closure and said tray and between said tray and said vessel, a container for gas-producing chemicals carried by said closure and normally extending downwardly therefrom into a reacting liquid in said tray, and a passageway to lead gas from above said tray to the space beneath said tray, and a yielding latch operative to secure said closure, said tray and said vessel in a sufficiently tight relationship to maintain a predetermined pressure within said vessel, said latch being operative when pressure within the closed vessel exceeds a predetermined degree to permit said closure to yield sufficiently to permit escape of the excess pressure.

7. A beverage carbonating device, comprising the combination of a vessel adapted to contain an uncarbonated liquid, a closure for said vessel, an intervening tray, substantially gastight joints between said closure and said tray and between said tray and said vessel, a container for gas-producing chemicals carried by said closure and normally extending downwardly therefrom into a reacting liquid in said tray, and a passageway to lead gas from above said tray to the space beneath said tray, and means to permit the escape of excess pressure above a predetermined degree from within the closed device.

8. A beverage carbonating device, comprising the combination of a vessel adapted to contain an uncarbonated liquid, a closure for said vessel, an intervening tray, substantially gastight joints between said closure and said tray and between said tray and said vessel, a container for gas-producing chemicals carried by said closure and normally extending downwardly therefrom into a reacting liquid in said tray, and a passageway to lead gas from above said tray to the space beneath said tray, interengaging joints between said closure and said tray and between said tray and said vessel comprising tongue-and-groove constructions with yielding gaskets within the grooves and engageable by the tongues.

9. A beverage carbonating device, comprising the combination of a vessel adapted to contain an uncarbonated liquid, a closure for said vessel, an intervening tray, substantially gastight joints between said closure and said tray and between said tray and said vessel, a container for gas-producing chemicals carried by said closure and normally extending downwardly therefrom into a reacting liquid in said tray, and a passageway to lead gas from above said tray to the space beneath said tray, interengaging joints between said closure and said tray and between said tray and said vessel comprising tongue-and-groove constructions with yielding gaskets within the grooves and engageable by the tongues, and means to permit the escape of excess pressure above a predetermined degree from within the closed device.

10. A beverage carbonating device, comprising the combination of a vessel adapted to contain an uncarbonated liquid, a closure for said vessel, an intermediate tray provided with an upwardly opening reservoir, substantially gastight joints between said closure and said tray and between said tray and said vessel, a container for gas-producing chemicals carried by said closure and normally extending downwardly into a reaction liquid in said reservoir, and a passageway to lead gas from above said tray to and beneath the surface of a liquid in said vessel beneath said tray.

11. A beverage carbonating device, comprising the combination of a vessel adapted to contain an uncarbonated liquid, a closure for said vessel, an intermediate tray provided with an upwardly opening reservoir and with oppositely directed upper and lower communicating tubular extensions, the upper extension being in substantial liquid-obstructing, gas-passing contact with said closure and said lower extension projecting downwardly to a point below the normal level of a liquid in said vessel, and a container for gas-producing chemicals carried by said closure and normally extending downwardly into a reaction liquid in said reservoir.

12. A beverage carbonating device, comprising the combination of a vessel adapted to contain an uncarbonated liquid, a closure for said vessel, an intermediate tray provided with an upwardly opening reservoir and with oppositely directed upper and lower communicating tubular extensions, the upper extension being in substantial liquid-obstructing, gas-passing contact with said closure and said lower extension projecting downwardly to a point below the normal level of a liquid in said vessel, and a container for gas-producing chemicals carried by said closure and normally extending downwardly into a reaction liquid in said reservoir, and means to permit the escape of gas under excess pressure above a predetermined degree from within said device.

13. A beverage carbonating device, comprising the combination of a vessel adapted to contain an uncarbonated liquid, a closure for said vessel, an intervening tray, substantially gastight joints between said closure and said tray and between said tray and said vessel, a container for gas-producing chemicals carried by said closure and normally extending downwardly therefrom into a reacting liquid in said tray, a passageway to lead gas from above said tray to the space beneath said tray, a link hinge connection securing said vessel and said closure together in spaced relation, and a latch normally securing said tray between and in gastight relation with said vessel and said closure.

14. A beverage carbonating device, comprising the combination of a vessel adapted to contain an uncarbonated liquid, a closure for said vessel, an intervening tray, substantially gastight joints normally between said closure and said tray and between said tray and said vessel, a container for gas-producing chemicals carried by said closure and normally extending downwardly therefrom into a reacting liquid in said tray, a tubular extension of said tray projecting upwardly into close proximity with said closure sufficient to permit gas to pass while minimizing the possibility of liquid passing through said tray, a second tubular extension of said tray projecting downwardly into said vessel, a link hinge connection securing said vessel and said closure together in spaced relation, and a latch normally securing said tray between and in gastight relation with said vessel and said closure.

15. A beverage carbonating device, comprising the combination of a vessel adapted to contain an uncarbonated liquid, a closure for said vessel, an intervening tray, substantially gastight joints normally between said closure and said tray and between said tray and said vessel, a container for gas-producing chemicals carried by said closure and normally extending downwardly therefrom into a reacting liquid in said tray, a tubular extension of said tray projecting upwardy into approximate contact with the inner surface of said closure and downwardly into said vessel, said upwardly extension being provided with a passage way to permit gas from above said tray to enter and pass through said extension and into said vessel beneath said tray while resisting the passage of a liquid, a link hinge connection securing said vessel and said closure together in spaced relation, and a latch normally securing said tray between and in gastight relation with said vessel and said closure.

FRED JOHN MELDAU.

REFERENCES CITED

The following references are of record in the file of this patent:

UNITED STATES PATENTS

| Number | Name | Date |
|---|---|---|
| 20,382 | Wheeler | May 25, 1858 |
| 334,159 | Beretz | Jan. 12, 1886 |
| 620,963 | Read | Mar. 14, 1899 |
| 1,246,227 | Bouvin | Nov. 13, 1917 |
| 2,073,273 | Wetstein | Mar. 9, 1937 |
| 2,172,035 | Roth | Sept. 5, 1939 |